United States Patent Office 3,223,735
Patented Dec. 14, 1965

3,223,735
PRODUCTION OF 1,3-PROPYLENE DIAMINE
Heinrich Scholz, Ludwigshafen (Rhine), and Paul Guenthert, Iggelheim, Pfalz, Germany, assignors to Badische Anilin- & Soda-Fabrik Aktiengesellschaft, Ludwigshafen (Rhine), Germany
No Drawing. Continuation of application Ser. No. 708,759, Jan. 14, 1958. This application Dec. 10, 1962, Ser. No. 243,651
Claims priority, application Germany, Jan. 23, 1957, B 43,227
8 Claims. (Cl. 260—583)

This application is a continuation of application Serial No. 708,759, filed January 14, 1958, which is now abandoned.

This invention relates to a process for the production of 1,3-propylene diamine. More specifically, the invention relates to a process for the production of 1,3-propylene diamine from acrylonitrile and ammonia by treating the mixture of the initial materials at elevated temperature with hydrogen in the presence of hydrogenation catalysts.

It is known to prepare 1,3-propylene diamine by reaction of 1,3-dihalopropane with ammonia or, according to the method of Gabriel, from N,N'-trimethylene-diphthalimide by the action of caustic alkali solution. From U.S. Patent No. 2,425,693 it is also known to react alkoxypropionitriles with primary or secondary amines to form N-substituted β-aminopropionitriles which can be hydrogenated to the corresponding propylene diamines by known methods. If attempts are made to arrive at 1,3-propylene diamine in a similar way, by reacting alkoxypropionitrile with ammonia and hydrogenating the reaction product, 1,3-propylene diamine is not obtained because the reaction of alkoxypropionitriles with ammonia does not yield aminopropionitrile but a condensation product of indeterminate composition. It is further known that 1,3-propylene diamine is obtained by reacting acrylonitrile with ammonia to 1,3-aminopropionitrile and catalytically hydrogenating the aminopropionitrile formed in a second stage to 1,3-propylene diamine. This two-step process gives relatively low yields.

It is an object of the present invention to provide a process for the production of 1,3-propylene diamine which gives higher yields than the prior art processes. It is another object of the invention to provide a process for the production of 1,3-propylene diamine which is carried out continuously and in a single step.

We have now found that 1,3-propylene diamine is obtained in a continuous process in good yields by continuously mixing acrylonitrile with an excess of liquid ammonia in a ratio of 5 to 20 parts by weight of ammonia to 1 part by weight of acrylonitrile and continuously treating the liquid mixture with hydrogen at a temperature of from 20° to 200° C. and under a pressure between 15 and 500 atmospheres in the presence of a hydrogenation catalyst.

Suitable hydrogenation catalysts are the conventional hydrogenation catalysts, e.g., metals of groups V–B, VI–B, VII–B and VIII of the periodic system or compounds thereof, for example the nitrates, carbonates, hydroxides, oxides or sulfides, as well as mixtures of the same. Examples are vanadium, niobium, tantalum, chromium, molybdenum, tungsten, manganese or compounds thereof. Conventional mixed hydrogenation catalysts, as for example copper-chromium oxide catalysts, may also be used. It is advantageous to use metals of group VIII of the periodic system, for example cobalt and/or nickel or their compounds, especially the oxides of these metals. Copper may also be used as hydrogenation catalyst. The last-mentioned metals may also be used in the form of Raney catalysts. The catalysts may be used alone or applied to carriers. As carriers for the catalysts there are suitable, for example, alumina, the natural or synthetic silicates, silica gel, zinc oxide, titanium oxide or magnesium oxide.

It is advantageous to subject the catalysts prior to the reaction to a reducing treatment at elevated temperature, for example at 300° to 500° C., and under increased pressure, for example at 50 to 350 atmospheres, in a stream of hydrogen. The catalysts may be rigidly arranged in the reaction chamber. They may however also be agitated in the reaction chamber or kept in turbulent motion by the fluidized bed principle in powdery, granulated or pelleted form. The hydrogen necessary for the hydrogenation preferably serves for fluidizing the catalysts.

In order to carry out the process, acrylonitrile and liquid ammonia in a large excess are intimately mixed. The mixing may be carried out for example in a tubular mixing device or nozzle. In this case the acrylonitrile and the liquid ammonia are led through two pipes arranged at an angle through a nozzle into a larger pipe in such a way that the turbulence thereby produced effects thorough mixing of the two substances. About 5 to 20, advantageously 8 to 15, especially 12, parts by weight of liquid ammonia is used for each part by weight of acrylonitrile. This large excess of ammonia is necessary in order to suppress side reactions which lead to di-(ω-cyanoethyl)-amine and di-(ω-aminopropyl)-amine. The mixture is then preferably heated to the reaction temperature, or to a temperature lying somewhat below the same, for example to 60° to 90° C. One or both components may be heated prior to mixing. The liquid reaction mixture is then led over the catalyst together with hydrogen.

The liquid initial materials may also be trickled downward over a rigidly arranged catalyst and preheated hydrogen introduced into the reaction vessel in cocurrent or countercurrent at one or more places.

Hydrogen is used in an amount of 100, 500, 1000 or 3000 liters or more, especially 600 to 800 liters, per kilogram of liquid feed mixture. Instead of technical hydrogen, gases may be used which mainly contain hydrogen provided they are free from catalyst poisons. In this case larger amounts of these gases are necessarily according to the hydrogen contents. The reaction is carried out at a temperature of 20° to 200° C., especially 50° to 150° C., advantageously 90° to 120° C., and under a pressure of 15 to 500 atmospheres, advantageously at 50 to 400 atmospheres. The reaction is preferably carried out continuously, and by a suitable feed rate the formation of high-boiling byproducts and the formation of residues, both of which are dependent in a high degree on the residence time at the catalyst, are avoided.

The liquid reaction mixture leaving the reaction chamber is preferably worked up immediately by fractional distillation. The fractional distillation is preceded by the separation of the hydrogen and the ammonia or a part thereof, and this may be done either under the reaction pressure or after a partial decompression while utilizing the heat content. The procedure may be, for example, that any partly dissolved hydrogen present in the reaction mixture is first liberated by partial decompression and returned into the hydrogen circulation, while the excess ammonia wholly or partly escaping at the same time is separated after liquefaction by raising the pressure and used again for mixing with acrylonitrile. In the subsequent distillation stage, the residual ammonia is set free upon complete decompression. This can also be liquefied by pressure increase and separated.

The method according to this invention shows considerable advantages as compared with the methods hitherto known. While in the reaction of 1,3-dihalopropanes with ammonia considerable amounts of useless ammonium halide are obtained which must be removed from the reaction mixture with great technical difficulty, the reaction mixture obtained according to the process of the present invention can be worked up in a simple way by fractional distillation. The process affords very high yields which consist for the most part of pure 1,3-propylene diamine which can readily be separated from the di-(ω-aminopropyl)-amine obtained as a byproduct. Both the 1,3-propylene diamine and also the di-(ω-aminopropyl)-amine obtained as a byproduct are valuable products, for example for the surface coatings and rubber industries.

The following examples will further illustrate this invention, but the invention is not restricted to these examples. The parts specified in the examples are parts by weight.

*Example 1*

100 parts of acrylonitrile and 1,400 parts of liquid ammonia are passed through a heated tube. The resultant reaction mixture heated to 70° C. is led, together with a large excess of hydrogen, under a pressure of 300 atmospheres and at a temperature of 85° to 105° C. through a vertical reaction vessel which is filled with shaped reduced cobalt oxide.

On distilling the reaction mixture under pressure, the excess ammonia is first recovered in liquid form and may be returned to the reaction. Upon further distillation at atmospheric pressure, pure 1,3-propylene diamine passes over at 136° to 138° C. as the main product. Then follows di-(ω-aminopropyl)-amine which boils at 95° to 97° C. at 3 mm. Hg. The total yield of amine mixture, consisting of about 2 parts of 1,3-propylene diamine to each part of di-(ω-aminopropyl)-amine, is 97% of the theoretical yield.

*Example 2*

By using 74.3 parts of acrylonitrile and 1,100 parts of liquid ammonia and carrying out the reaction with hydrogen described in Example 1 under a pressure of 220 atmospheres at a temperature of 100° to 110° C., 66.5 parts of 1,3-propylene diamine and 28.5 parts of di-(ω-aminopropyl)-amine are obtained, i.e., about 95% of the theoretical yield with reference to the acrylonitrile used.

*Example 3*

8.2 parts of acrylonitrile per hour is led together with 110 parts of liquid ammonia under a pressure of about 300 atmospheres through a heated mixing device in which the reaction mixture is preheated to 85° C. This mixture is then introduced continuously, together with hydrogen, into the lower part of a vertical reaction tower which is filled with reduced cobalt oxide pellets. The reaction temperature is 90° to 110° C. In order to maintain this temperature, superheated hydrogen is led into the reaction tower at one or more places. The product continuously leaving the upper end of the reaction tower is led through a heat exchanger into a separator from which the excess hydrogen is withdrawn and recycled to the reaction. It is advantageous to construct the mixing device as the heat exchanger in order to utilize the reaction heat for heating the feed materials.

The liquid fraction is worked up as described in Example 1. 7.15 parts of pure 1,3-propylene diamine is obtained per hour besides 3.1 parts of di-(ω-aminopropyl)-amine, i.e., about 93% of the theoretical yield with reference to the acrylonitrile introduced.

*Example 4*

100 parts of acrylonitrile is led together with 1,400 parts of liquid ammonia through a heatable tube. The reaction mixture heated to 80° to 90° C. is led together with a large excess of hydrogen under a pressure of 300 atmospheres and at a temperature of 95° to 110° C. through a vertical reaction vessel which has been pretreated under reducing conditions. This vessel is filled with a catalyst consisting of silica pellets of 4 mm. in diameter onto which 25% of cobalt and 2 to 3% of chromium have been precipitated. The reaction mixture is worked up in the way described in Example 1. The total yield of amine mixture, consisting of 1,3-propylene diamine and di-(ω-aminopropyl)-amine at a ratio of 2 to 1, exceeds 90% of the theoretical yield.

*Example 5*

100 parts of acrylonitrile per hour is led together with 1,200 parts of liquid ammonia through a heatable tube. The reaction mixture heated to 95° C. is led together with a large excess of hydrogen under a pressure of 350 atmospheres and at a temperature of 95° to 110° C. through a vertical reaction vessel which is filled with shaped reduced nickel oxide.

The reaction mixture is worked up as set forth in Example 1. The yield of amine mixture, consisting of about 2 parts of 1,3-propylene diamine to each part of di-(ω-aminopropyl)-amine, exceeds 90% of the theoretical yield.

We claim:

1. A continuous process for the production of 1,3-propylene diamine which comprises continuously mixing acrylonitrile with an excess of liquid ammonia in a ratio of 5 to 20 parts by weight of ammonia to one part by weight of acrylonitrile and continuously treating the liquid mixture with hydrogen at a temperature of from 20° to 200° C. and under a pressure of between 15 and 500 atmospheres in the presence of a hydrogenation catalyst.

2. A process as claimed in claim 1, wherein 8 to 12 parts by weight of liquid ammonia are used for each part by weight of acrylonitrile.

3. A continuous process for the production of 1,3-propylene diamine which comprises continuously mixing one part by weight of acrylonitrile with 5 to 20 parts by weight of liquid ammonia, continuously treating the liquid mixture with hydrogen at a temperature of from 20° to 200° C. under a pressure of between 15 and 500 atmospheres in the presence of a hydrogenation catalyst, recovering the excess of liquid ammonia by distillation under pressure and subjecting the reaction mixture obtained to fractional distillation after decompression.

4. A continuous process for the production of 1,3-propylene diamine which comprises continuously mixing acrylonitrile with an excess of liquid ammonia in a ratio of 5 to 20 parts by weight of ammonia to one part by weight of acrylonitrile and continuously treating the liquid mixture with hydrogen at a temperature from 20° C. to 200° C. and under a pressure of between 15 and 500 atmospheres in the presence of a hydrogenation catalyst selected from the group consisting of copper and metals of the 5th to 8th groups of the periodic system.

5. A process as claimed in claim 4 wherein 8 to 12 parts by weight of liquid ammonia are used for each part by weight of acrylonitrile.

6. A process as claimed in claim 4 wherein nickel is the metal of the hydrogenation catalyst.

7. A process as claimed in claim 4 wherein cobalt is the metal of the hydrogenation catalyst.

8. A continuous process as claimed in claim 4 wherein the liquid mixture is maintained at a temperature of about 50° C. to 150° C. and a pressure of about 50 to 400 atmospheres.

References Cited by the Examiner

FOREIGN PATENTS 122,479  10/1946  Australia.

OTHER REFERENCES

Whitmore et al.: J.A.C.S., vol. 66, pp. 725–31 (1944).

CHARLES B. PARKER, *Primary Examiner.*